(12) United States Patent
Kester et al.

(10) Patent No.: US 12,674,914 B2
(45) Date of Patent: Jul. 7, 2026

(54) THIN FILM OPTICAL LENS AND METHOD FOR COATING A LENS

(71) Applicant: Quantum Innovations, Inc., Central Point, OR (US)

(72) Inventors: Norman L. Kester, Moose Lake, MN (US); Nicholas M. Hall, Klamath Falls, OR (US); Richard D Unbankes, West Covina, CA (US)

(73) Assignee: Quantum Innovations, Inc., Central Point, OR (US)

( * ) Notice: Subject to any disclaimer, the term of this patent is extended or adjusted under 35 U.S.C. 154(b) by 263 days.

(21) Appl. No.: 18/669,360

(22) Filed: May 20, 2024

(65) Prior Publication Data

US 2024/0302570 A1 Sep. 12, 2024

Related U.S. Application Data

(62) Division of application No. 16/856,394, filed on Apr. 23, 2020, now Pat. No. 12,147,008.

(Continued)

(51) Int. Cl.
| | |
|---|---|
| *G02B 1/10* | (2015.01) |
| *C03C 17/34* | (2006.01) |
| *G02B 5/20* | (2006.01) |
| *G02B 1/115* | (2015.01) |
| *G02B 5/28* | (2006.01) |

(52) U.S. Cl.
CPC ............ *G02B 1/10* (2013.01); *C03C 17/3417* (2013.01); *G02B 5/208* (2013.01); *C03C*

2217/213 (2013.01); *C03C 2217/22* (2013.01); *C03C 2217/734* (2013.01); *C03C 2218/151* (2013.01);

(Continued)

(58) Field of Classification Search
None
See application file for complete search history.

(56) References Cited

U.S. PATENT DOCUMENTS

| | | |
|---|---|---|
| 2,391,595 A | 12/1945 | Richards et al. |
| 5,409,760 A | 4/1995 | Neitz et al. |

(Continued)

FOREIGN PATENT DOCUMENTS

WO WO2015009349 1/2015

*Primary Examiner* — Robert E. Tallman
(74) *Attorney, Agent, or Firm* — Spencer Fane, LLP

(57) ABSTRACT

A thin film optical lens and method for coating an optical substrate serves to apply alternating layers, with varying thicknesses, of a high index dielectric material and a low index dielectric material on first and second surfaces of an optical substrate. The high and low index dielectric materials are layered through thin film deposition. The low index dielectric material is $SiO_2$. The high index dielectric material is $ZrO_2$ and/or Indium Zinc Oxide. The spectral results from application of high and low index dielectric materials reduce infrared radiation, block HEV light transmission, and reduce backside ultraviolet reflections, while also increasing visible (ultraviolet) light transmission through the optical substrate. Thus, the layering of dielectric materials on the first surface of optical substrate reflects up to 40% of the infrared radiation; and the second surface of optical substrate transmits 99% of ultraviolet light in the wavelength range between 300 to 400 nanometers.

7 Claims, 4 Drawing Sheets

*700*

| | LAYER | MATERIAL | REFRACTIVE INDEX | EXTINCTION COEFFICIENT | OPTICAL THICKNESS (FWOT) | PHYSICAL THICKNESS (nm) |
|---|---|---|---|---|---|---|
| ▷ | Medium | Glass | 1.52083 | 0.00000 | | |
| 106 | 1 | SiO2 | 1.46180 | 0.00000 | 0.41561044 | 145.00 |
| 202 | 2 | ZrO2 | 2.06577 | 0.00004 | 0.06075779 | 15.00 |
| | 3 | SiO2 | 1.46180 | 0.00000 | 0.04872674 | 17.00 |
| 204 | 4 | IZO (250) | 2.03053 | 0.02346 | 0.41605960 | 104.50 |
| | 5 | SiO2 | 1.46180 | 0.00000 | 0.43854067 | 153.00 |
| | 6 | ZrO2 | 2.06577 | 0.00004 | 0.41720352 | 103.00 |
| | 7 | SiO2 | 1.46180 | 0.00000 | 0.21497092 | 75.00 |
| | Substrate | Air | 1.0000 | 0.00000 | | |

Related U.S. Application Data

(60) Provisional application No. 62/838,751, filed on Apr. 25, 2019.

(52) U.S. Cl.
CPC ........ *C03C 2218/156* (2013.01); *G02B 1/115* (2013.01); *G02B 5/283* (2013.01)

(56) References Cited

U.S. PATENT DOCUMENTS

| | | | |
|---|---|---|---|
| 5,449,413 | A | 9/1995 | Beauchamp et al. |
| 5,541,735 | A | 7/1996 | Rengle |
| 5,694,240 | A | 12/1997 | Sternbergh |
| 6,906,862 | B2 | 6/2005 | Cross |
| 7,873,213 | B2 | 1/2011 | Speigle et al. |
| 8,358,467 | B2 | 1/2013 | Yan et al. |
| 8,557,877 | B2 | 10/2013 | Mukhupadhyay et al. |
| 9,291,746 | B2 | 3/2016 | Avetisian, Sr. et al. |
| 2002/0024705 | A1 | 2/2002 | Nakano |
| 2005/0143812 | A1 | 6/2005 | Paul et al. |
| 2008/0199670 | A1 | 8/2008 | Yaoita et al. |
| 2008/0206470 | A1* | 8/2008 | Thomas ................. C23C 14/10 427/402 |
| 2009/0046368 | A1 | 2/2009 | Banerjee et al. |
| 2009/0283133 | A1 | 11/2009 | Hebrink et al. |
| 2010/0238557 | A1* | 9/2010 | Tomoda ................. G02B 1/111 156/60 |
| 2012/0028005 | A1* | 2/2012 | Zheng .................... C23C 14/10 427/164 |
| 2013/0038834 | A1 | 2/2013 | Cado et al. |
| 2014/0374377 | A1 | 12/2014 | Schultz et al. |
| 2015/0064341 | A1* | 3/2015 | Ogawa .................. G02C 7/022 427/8 |
| 2015/0083193 | A1 | 3/2015 | Ueda |
| 2015/0138638 | A1* | 5/2015 | Mashimo ................ G02B 1/18 359/581 |
| 2015/0146161 | A1 | 5/2015 | Rigato et al. |
| 2015/0241602 | A1 | 8/2015 | Avetisian, Sr. et al. |
| 2017/0299896 | A1* | 10/2017 | Ogo ...................... G02B 1/116 |
| 2018/0113326 | A1 | 4/2018 | Gloege et al. |
| 2023/0072027 | A1* | 3/2023 | Ishimura ................ G02C 7/02 |

* cited by examiner

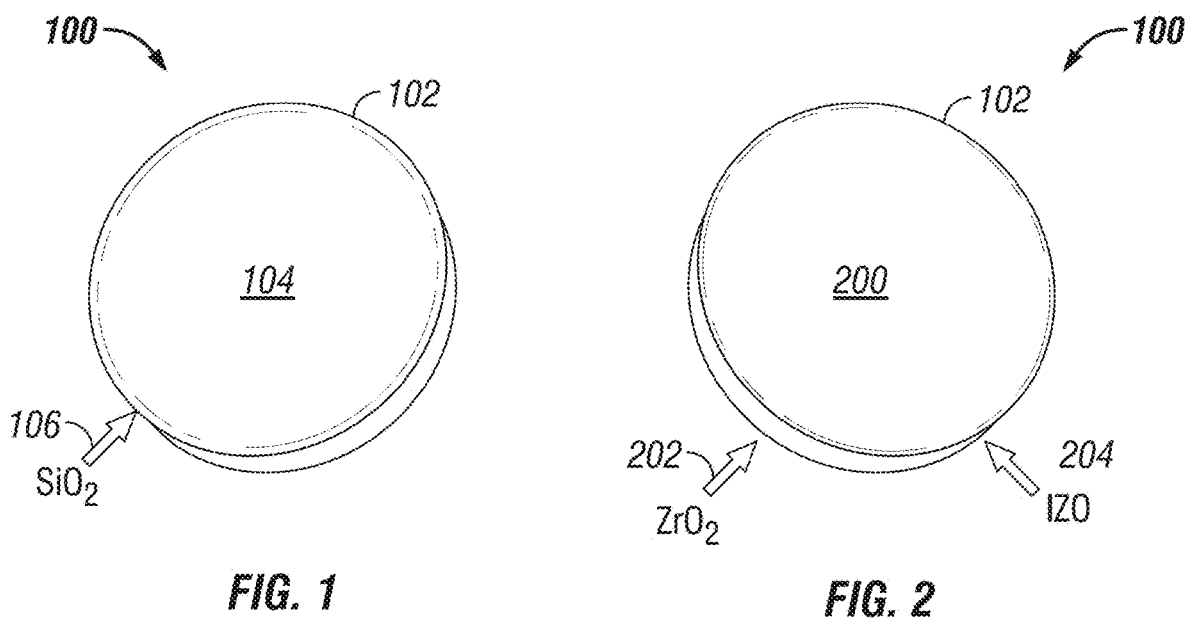
FIG. 1          FIG. 2
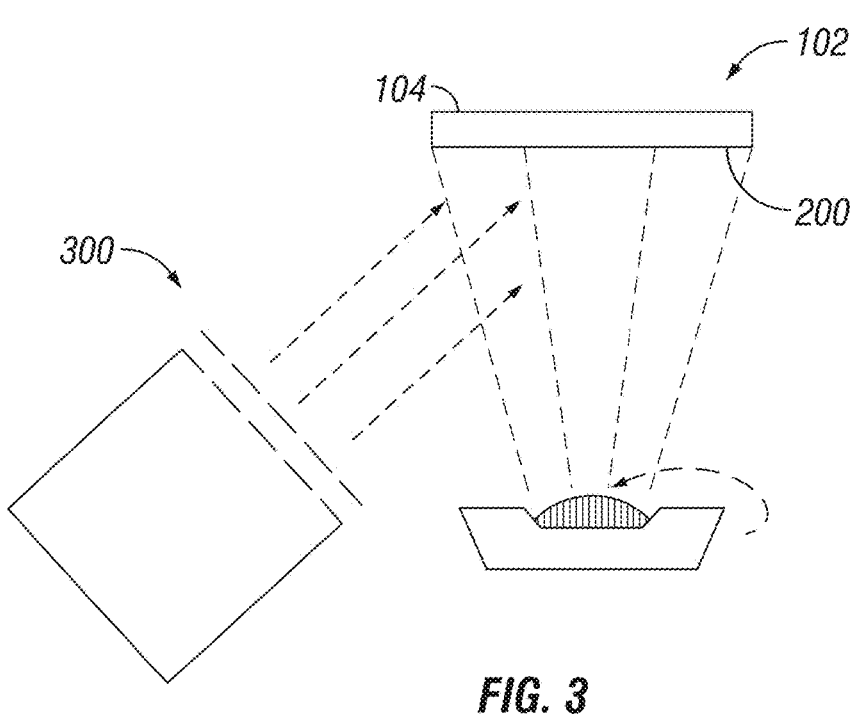
FIG. 3

| LAYER | | MATERIAL | REFRACTIVE INDEX | EXTINCTION COEFFICIENT | OPTICAL THICKNESS (FWOT) | PHYSICAL THICKNESS (nm) |
|---|---|---|---|---|---|---|
| Medium | | Glass | 1.52083 | 0.00000 | | |
| 1 | | SiO2 | 1.46180 | 0.00000 | 0.41561044 | 145.00 |
| 2 | | ZrO2 | 2.06577 | 0.00004 | 0.06152739 | 15.19 |
| 3 | | SiO2 | 1.46180 | 0.00000 | 0.05041785 | 17.59 |
| 4 | | ZrO2 | 2.06577 | 0.00004 | 0.42327930 | 104.50 |
| 5 | | SiO2 | 1.46180 | 0.00000 | 0.44091968 | 153.83 |
| 6 | | ZrO2 | 2.05677 | 0.00004 | 0.41898575 | 103.44 |
| 7 | | SiO2 | 1.46180 | 0.00000 | 0.21600278 | 75.36 |
| Substrate | | Air | 1.0000 | 0.00000 | | |

THIN FILM OPTICAL LENS AND METHOD FOR COATING A LENS

CROSS-REFERENCE TO RELATED APPLICATIONS

This application is a divisional patent application of U.S. application Ser. No. 16/856,394, filed Apr. 23, 2020 and entitled THIN FILM OPTICAL LENS COATING METHOD which claims the benefits of U.S. provisional application No. 62/838,751 filed Apr. 25, 2019 and entitled THIN FILM OPTICAL LENS COATING METHOD. All applications are hereby incorporated by reference herein in their entirety.

FIELD OF THE INVENTION

The present invention relates generally to a thin film optical lens and method for coating a lens. More so, the method is configured to treat an optical substrate with alternating layers of a low index dielectric material and a high index dielectric material of varying thicknesses; whereby the application of dielectric materials in this combination serve to reduce infrared radiation, block HEV light transmission, and reduce backside ultraviolet reflections, while also increasing visible light transmission through the optical substrate.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, a viewing lens is a transmissive optical device that focuses or disperses a light beam by means of refraction. A simple lens consists of a single piece of transparent substrate, viewing lenses are primarily made from optical glass and ground to certain specifications. Viewing lenses are planar, plano-convex, plano-concave, or double convex or double concave, and are ground as to have spherical or cylindrical surfaces. Viewing lenses are a great help but often produce objectionable reflections that interfere with the vision.

Typically, the human eye sees a wide range of light in many spectrum ranges. The most desirable viewing range for humans are the visible ranges in wavelength from approximately 400 nanometers ($4\times10^{-7}$ m—violet) to 700 nm ($7\times10^{-7}$ m—red). Less desirable wavelengths can, however, create ultraviolet light, high-energy light, and infrared radiation. These lights are not efficacious for enhanced viewing. It is also known that the human eye does not perceive the UV wavelengths of light. Current viewing optical lenses and viewing surfaces reflect varying amounts of light. These optical lenses and viewing surfaces are often treated to create visual effects or increased light transmission or sensitivity. It would be advantageous to have a process that treats an optical substrate for producing a novel thin film optical lens designed to reduce infrared radiation, block HEV light transmission, increase visible light transmission, and eliminate backside ultraviolet reflection.

Other proposals have involved methods for coating lenses. The problem with these lenses and methods of coating is that they do serve to reduce infrared radiation, block HEV light transmission, and reduce backside ultraviolet reflections, while also increasing visible light transmission through the optical substrate. Even though the above cited methods for coating lenses meet some of the needs of the market, a thin film optical lens and method for coating a lens for treating an optical substrate with alternating layers of a low index dielectric material and a high index dielectric material of varying thicknesses; whereby the application of dielectric materials in this combination serve to reduce infrared radiation, block HEV light transmission, and reduce backside ultraviolet reflections, while also increasing visible light transmission through the optical substrate, is still desired.

SUMMARY

Illustrative embodiments of the disclosure are generally directed to a thin film optical lens and method for coating a lens. The method is configured to apply alternating layers with varying thicknesses of a low index dielectric material and a high index dielectric material on at least one of the surfaces of an optical substrate. The low and high index dielectric materials are layered on the optical substrate through thin film deposition means to create a desired spectral result in the optical substrate. The low index dielectric material can include $SiO_2$. The high index dielectric material can include $ZrO_2$, or possibly an Indium Zinc Oxide material.

The desired spectral results from application of the dielectric materials are effective for reducing infrared radiation, blocking HEV light transmission, and reducing backside ultraviolet reflections, while also increasing visible light transmission through the optical substrate. Another beneficial spectral result of the dielectric materials is that the visible light transmission through the optical substrate increases. Additionally, as a result of layering the dielectric materials in this novel manner, the first surface of the optical substrate reflects up to 40% of the infrared radiation. And further, application of the dielectric material enables the second surface of the optical substrate to transmit about 99% of the ultraviolet light in the wavelength range between 300 to 400 nanometers.

In a first embodiment of a method for coating a thin film optical lens, an initial Step comprises, providing an optical substrate, the optical substrate comprising a first surface and an opposing second surface, the first surface being operable to at least partially reflect infrared radiation, the second surface being operable to at least partially transmit ultraviolet light in the wavelength range between 300 to 400 nanometers.

Another Step may include cleaning the surfaces of the optical substrate.

The method also includes a Step of applying a low index dielectric material and a high index dielectric material on at least one of the first and second surfaces of the optical substrate, the low index dielectric material and the high index dielectric material being applied in the following order.

A Step of applying about 145.00 nanometers of the low index dielectric material on at least one of the first and second surfaces of the optical substrate.

A Step of applying about 15.00 nanometers of the high index dielectric material on at least one of the first and second surfaces of the optical substrate.

A Step of applying about 17.00 nanometers of the low index dielectric material on at least one of the first and second surfaces of the optical substrate.

A Step of applying about 104.50 nanometers of the high index dielectric material on at least one of the first and second surfaces of the optical substrate.

A Step of applying about 153.00 nanometers of the low index dielectric material on at least one of the first and second surfaces of the optical substrate.

A Step of applying about 103.00 nanometers of the high index dielectric material on at least one of the first and second surfaces of the optical substrate.

Another Step may include applying about 75.00 nanometers of the low index dielectric material on at least one of the first and second surfaces of the optical substrate.

As a result of application of the dielectric materials, the first surface reflects up to 40% of the infrared radiation. And further, application of dielectric materials enable the second surface to transmit about 99% of the ultraviolet light in the wavelength range between 300 to 400 nanometers.

Another Step may include flipping the optical substrate from the first surface to the second surface during application of the dielectric materials.

A final Step in the method comprises integrating the optical substrate into a device.

In another aspect, the method further comprises a Step of hand-cleaning the surfaces of the optical substrate.

In another aspect, the optical substrate comprises a viewing lens.

In another aspect, the low index dielectric material comprises $SiO_2$.

In another aspect, the $SiO_2$ comprises a refractive index of 1.46.

In another aspect, the high index dielectric material comprises $ZrO_2$.

In another aspect, the $ZrO_2$ comprises a refractive index of 2.06.

In another aspect, the high index dielectric material comprises Indium Zinc Oxide.

In another aspect, the dielectric material is applied with a thin film deposition mechanism.

In another aspect, the thin film deposition mechanism comprises an electron beam evaporation and a magnetron reactive sputtering.

One objective of the present invention is to reduce infrared radiation, block HEV light transmission, and reduce backside ultraviolet reflections, while also increasing visible light transmission through an optical substrate, such as a viewing lens.

Another objective is to reduce the glare from ultraviolet wavelengths from 300 to 400 nm to 1% off the second surface of the optical substrate by treating the optical substrate with an anti-reflective dielectric material coating on at least one side of the optical substrate.

Yet another objective is to reflect up to 40% of infrared radiation by treating the optical substrate with an anti-reflective dielectric material coating on at least one surface of the optical substrate.

Yet another objective is to absorb up to 40% of the high-energy visible light in the range of the spectrum from 400 to 455 nm.

Yet another objective is to produce a viewing optical substrate or viewing surface that has the appearance of little to no reflection in the visible range of the electromagnetic spectrum.

Yet another objective is to provide an inexpensive to implement method for coating a thin film optical lens.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 1 shows a perspective view of an exemplary thin film optical lens, showing a first surface of an optical substrate being coated with a low index dielectric material, in accordance with an embodiment of the present invention;

FIG. 2 shows a perspective view of the thin film optical lens shown in FIG. 1, showing a second surface of an optical substrate being coated with a high index dielectric material, in accordance with an embodiment of the present invention;

FIG. 3 shows a perspective view of an exemplary thin film deposition mechanism coating an optical substrate with a dielectric material, in accordance with an embodiment of the present invention;

Like reference numerals refer to like parts throughout the various views of the drawings.

DETAILED DESCRIPTION OF THE INVENTION

Figures 4, 5:
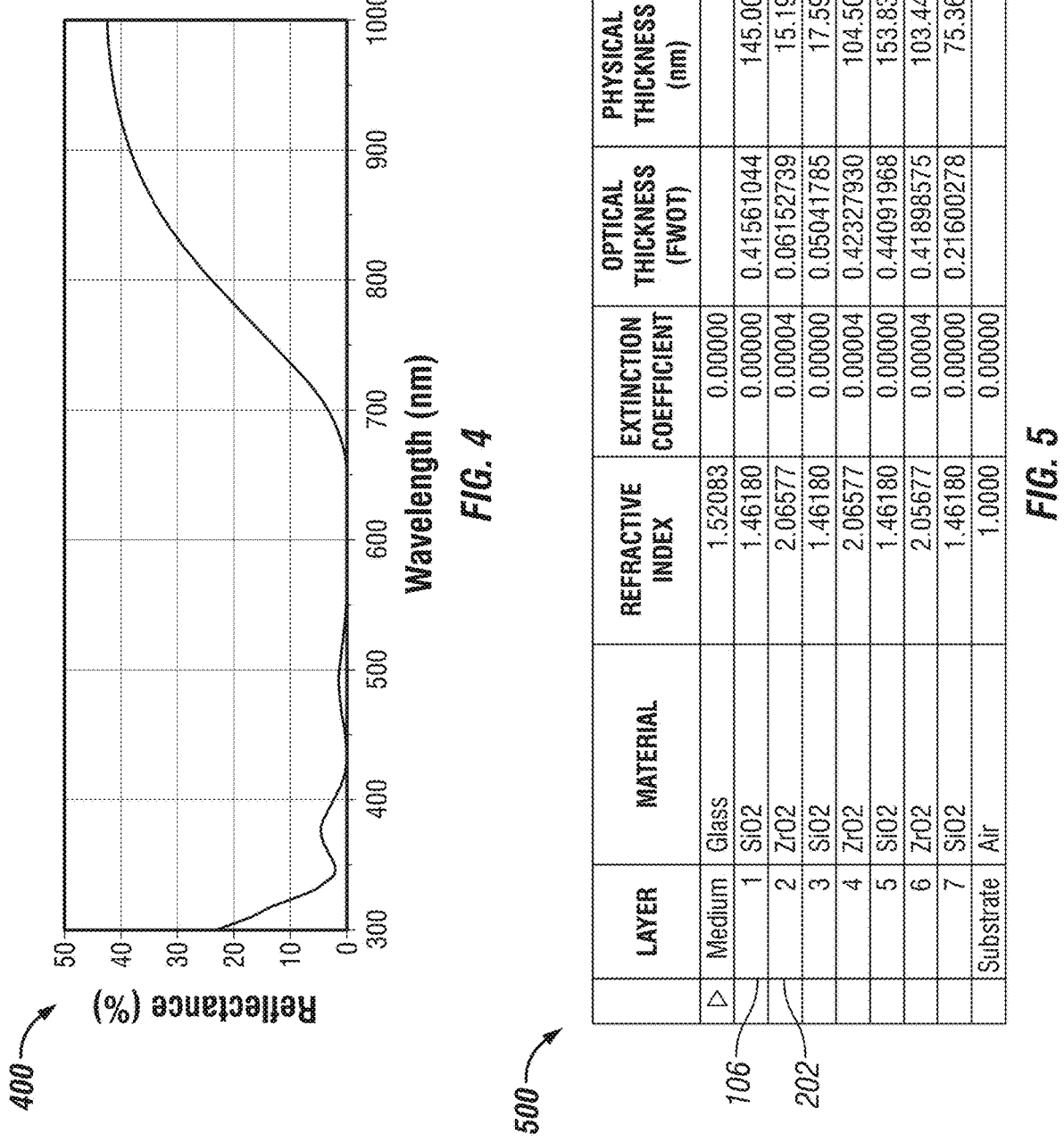
FIG. 4 shows a graph depicting an example of the reflectance spectrum of this coating across the ultraviolet, visible and near infrared spectrum, in accordance with an embodiment of the present invention.
FIG. 5 shows a Table of a first embodiment of multiple coatings of low index dielectric materials and high index dielectric materials, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A thin film optical lens 100 and method 800 for coating a lens is referenced in FIGS. 1-8. The thin film optical lens 100 provides an optical substrate 102, such as a viewing lens, that is treated to transmit and reflect varying amounts and types of light, so as to enhance viewing therethrough. The method 800 applies multiple layers/coats of both low index, and high index dielectric materials on at least one of the surfaces 104, 200 of optical substrate 102. The resultant is that the optical substrate 102 reduces transmission of infrared radiation, blocks high-energy visible light (HEV light) transmission, and reduces backside ultraviolet reflections, all of which serves to enhance viewing. The application of the dielectric materials 106, 202, 204 also serves to increase visible light transmission, i.e., ultraviolet light, through the optical substrate 102, which also enhances viewing therethrough.

The dielectric materials 106, 202, 204 that are applied to the surfaces of the optical substrate 102 include a unique combination of low index dielectric materials 106 and high index dielectric materials 202, 204. The dielectric materials are applied in alternating layers on at least one of the surfaces of the optical substrate 102. The method 800 also makes use of a thin film deposition mechanism 300, such as electron beam evaporation and magnetron reactive sputtering to apply the dielectric materials 106, 202, 204.

Those skilled in the art will recognize that the human eye sees a wide range of light in many spectrum ranges. The most desirable viewing range for humans are the visible ranges in wavelength from approximately 400 nanometers $(4 \times 10^{-7}$ m—violet) to 700 nm $(7 \times 10^{-7}$ m—red). Other light wavelengths can, however, create less desirable ultraviolet light, high-energy light, and infrared radiation. These lights are not efficacious for enhanced viewing. It is also known that the human eye does not perceive the UV wavelengths of light. The method 800 treats an optical substrate 102 to create a novel thin film optical lens designed to reduce infrared radiation, block HEV light transmission, increase visible light transmission, and eliminate backside ultraviolet reflection.

Looking now at FIGS. 1-2, the optical substrate 102 provides a unique viewing lens that may include, without limitation, an optical lens, a dielectric coated optic lens, a metallic coated optic lens, a mirror, and a variable reflectivity mirror. The optical substrate 102 may be fabricated from glass or a polymer associated with viewing lenses. The optical substrate 102 may be planar, plano-convex, plano-concave, double convex, or double concave. The optical substrate 102 may be ground as to have spherical or cylindrical surfaces. In some embodiments, the optical substrate 102 can be disc-shaped, rectangular-shaped, or square-shaped.

In one possible embodiment, the optical substrate 102 comprises a first surface 104 and an opposing second surface 200. The optical substrate 102 also has an edge, of varying thicknesses, that forms a perimeter nexus between the first and second surfaces 104, 200. The surfaces 104, 200 are treated by coating with varying thicknesses of dielectric materials 106, 202, 204 independently of each other, so as to achieve a desired light reflection or transmission characteristic.

As FIG. 1 shows, the first surface 104 is treated to at least partially reflect infrared radiation. It is known in the art that infrared radiation is undesirable for enhanced viewing through a lens. This treatment may be prefabricated, prior to use of the method 800 onto the optical substrate 102. Similarly, the second surface 200 is configured to at least partially transmit ultraviolet light in the wavelength range between 300 to 400 nanometers. It is known in the art that ultraviolet light enhances viewing through a lens. And as FIG. 2 illustrates, the second surface 200 may also be pretreated prior to use of the method 800 onto the optical substrate 102. Additionally, the method 800 may require that the surfaces 104, 200 of the optical substrate 102 be cleaned with a cleaner to remove dust and debris prior to the application of the dielectric material. This cleaning process can include a blower or a wiping mechanism. In another embodiment, the optical substrate 102 is hand-cleaned.

In some embodiments, the method 800 coats the optical substrate 102 with a low index dielectric material 106 and/or a high index dielectric material 202 on at least one of the surfaces 104, 200, or possibly both surfaces simultaneously. The dielectric materials may include substances that are poor conductor of electricity, but also possess the characteristics of supporting electrostatic fields. The low index dielectric material 106 and the high index dielectric material 202 are layered onto the first and second surfaces 104, 200 in varying thicknesses (nanometer thickness). In any case, different variations of nanometer thickness, low index dielectric material 106, and high index dielectric material 202 may also be used.

In one non-limiting embodiment, the low index dielectric material 106 is $SiO_2$. In some embodiments, the low index dielectric material 106 is a material having a low refractive index, indicating the speed through which light passes therethrough. For example, the low index material has a refractive index of about 1.46. In one non-limiting embodiment, the high index dielectric material 202 is $ZrO_2$, or in alternative embodiments, Indium Zinc Oxide 204. The high index dielectric material 202 is a material having a high refractive index, which is an indication of the speed through which light passes through the optical substrate 102. In one non-limiting embodiment, the high index material has a refractive index of 2.06. In alternative embodiments, additional index dielectric materials that can be applied on the surfaces of the optical substrate 102 may include, without limitation, Ag, Al, $Al_2O_3$, Au, Fe, Ge, MgF, Ti, $TiO_2$, and Zn.

As FIG. 3 references, a thin film deposition mechanism 300 is utilized to apply the dielectric materials onto their respective surfaces 104, 200. In some embodiments, the thin film deposition mechanism 300 may include an electron beam evaporation device and/or a magnetron reactive sputtering device. In one exemplary operation of the thin film deposition mechanism 300, a target anode, such as the optical substrate 102, is bombarded with an electron beam given off by a tungsten filament under high vacuum. The accelerated electrons strike the optical substrate 102 and melt/sublimate the material to transform into the gaseous phase. These atoms then precipitate into solid form, coating everything in the vacuum chamber with a thin layer of the anode material. And as described above, the application occurs in a vacuum coating system, either through electron beam gun evaporation techniques or via magnetron sputtering techniques. The dielectric materials are consequently integrated into the surfaces of the optical substrate 102.

In one non-limiting embodiment, the dielectric materials are applied to at least one of the first and second surfaces 104, 200 in a specific, layered arrangement. After cleaning the surfaces of the optical substrate 102, the layering of dielectric materials is as follows:

About 145.00 nanometers of the $SiO_2$ (low index dielectric material 106) is applied to one or both surfaces of the optical substrate 102. Next, a layer of about 15.00 nanometers of the $ZrO_2$ (high index dielectric material 202) is applied. In alternative embodiments, Indium Zinc Oxide 204 (IZO) can be used instead of, or in conjunction with, the $ZrO_2$. Continuing with the application of the dielectric material through the thin film deposition mechanism 300, about 17.00 nanometers of the $SiO_2$ is applied. An additional layer includes about 104.50 nanometers of the $ZrO_2$ material. Continuing with the layering, about 153.00 nanometers of the $SiO_2$ is next applied to at least one of the surfaces. The method 800 then requires that about 103.00 nanometers of the $ZrO_2$ material is applied. Finally, about 75.00 nanometers of the $SiO_2$ material is applied. While the following thicknesses of low and high index materials are listed, the thicknesses of dielectric materials may be increased or decreased to accommodate different types of optical substrates.

As a result of this novel application/coating process, the first surface 104 of the optical substrate 102 reflects up to 40% of the infrared radiation, serving to enhance viewing through the optical substrate 102. It is advantageous to reflect as much infrared radiation as possible for optimal viewing through the optical substrate 102.

Also, the view-enhancing ultraviolet light in the 300-400 nm range is transmitted up to 99% through the optical substrate 102.

Furthermore, the layered application of the low and high index dielectric materials 202 enables the second surface 200 of the optical substrate 102 to transmit about 99% of the ultraviolet light in the wavelength range between 300 to 400 nanometers. In this manner, the dielectric materials substantially eliminate reflection of ultraviolet light (300-400 nm) off the surface of the optical substrate 102 into the eye by allowing the ultraviolet light to be transmitted and absorbed by the optical substrate 102 itself. Thus, in the visible spectrum, the layering of dielectric materials increases light transmission to the eye by reducing the surface reflection to approximately 1%. In other words, only 1% of ultraviolet light is blocked by the treated optical substrate 102. This effect on ultraviolet light can be advantageous for enhancing viewing through the optical substrate 102.

In a graphical illustration of the enhanced viewing, a reflectance spectrum graph 400 for the optical substrate 102 references the amount and effects of the dielectric materials on the optical substrate 102 (See FIG. 4). The application, as described in the above steps, serves to reflect varying amounts of ultraviolet, visible light, and near infrared spectrum. As shown in the graph 400, at a wavelength less than 340 nm and greater than 700 nm, the reflectance increases. This is a direct correlation to the first embodiment of the low and high index dielectric materials applied to the optical substrate 102. Consequently, second surface 200 of the optical substrate 102 is designed to reflect very little in the visible range of light between 400-700 nm, or the UV range between 300-400 nm.

As Table 500 in FIG. 5 shows, the first embodiment of the method 800 involves applying alternating layers of dielectric materials in multiple layers of the low index dielectric material 106 and the high index dielectric material 202, 204. This includes applying 145.00 nm of the low index dielectric material 106 on the first surface 104 of the optical substrate 102, and applying 15.00 nm of the high index dielectric material 202 on the first surface 104 of the optical substrate 102. The subsequent applications of dielectric materials are as described above. Table 500 also provides an example of the stack design utilized to create the layering/coating of dielectric materials. Consequently, the method 800 is effective in protecting the eyes from harmful backside UV reflection; increasing visible light transmission for the visible spectrum; and reflecting infrared light away from the eye.

Figures 6, 7:
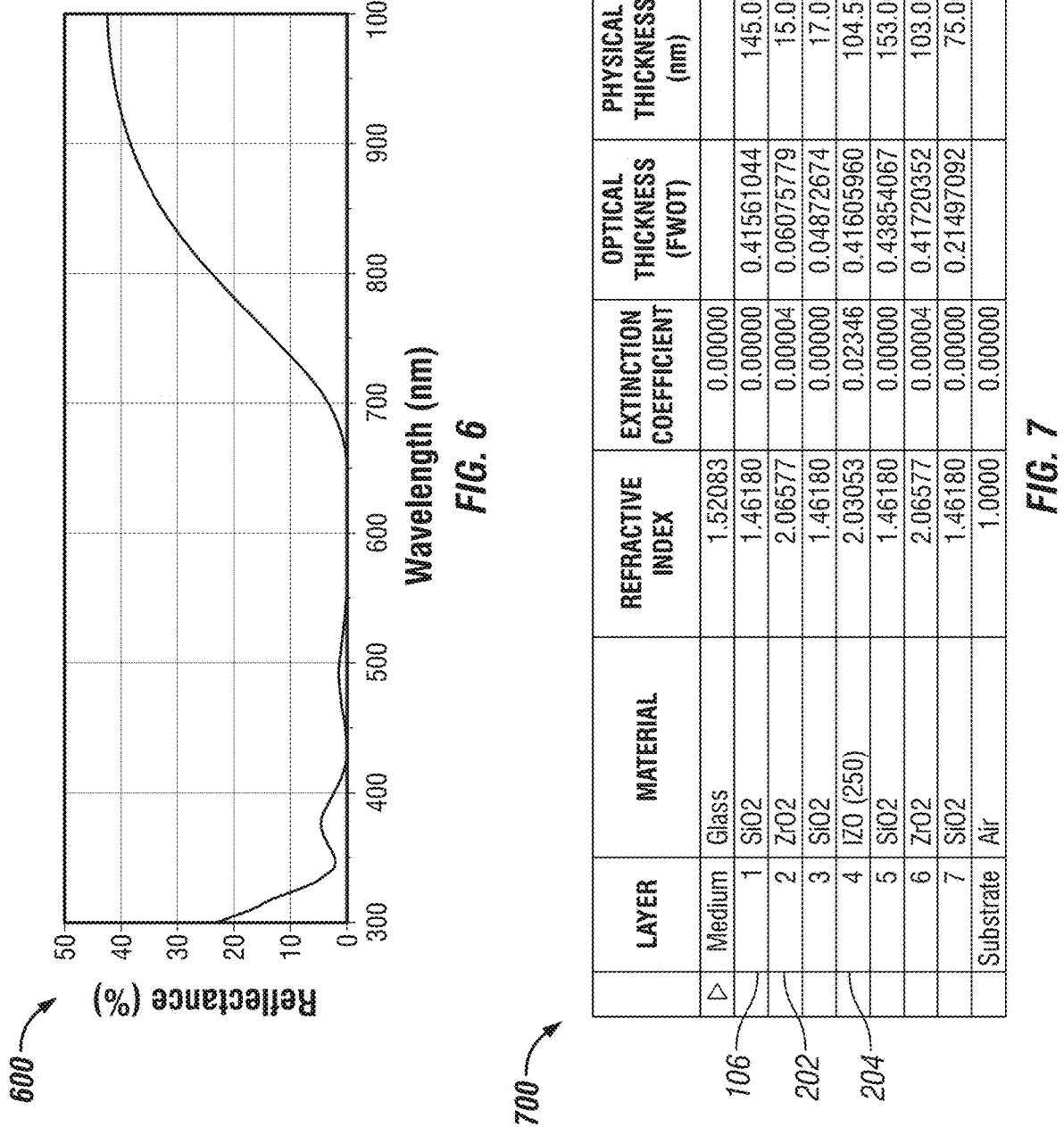
FIG. 6 shows a graph depicting an example of the reflectance spectrum of this coating across the ultraviolet, visible and near infrared spectrum, in accordance with an embodiment of the present invention.
FIG. 7 shows a Table of a second embodiment of multiple coatings of low index dielectric materials, high index dielectric materials, and IZO materials, in accordance with an embodiment of the present invention.

Another exemplary reflectance graph 600 is shown in FIG. 6. The graph 600 shows an example of the reflectance spectrum after application of the low and high index dielectric materials. The effects across the ultraviolet, visible, and near infrared spectrum are shown. This represents an embodiment when the high index dielectric material 202 includes, not only $ZrO_2$, but also, Indium Zinc Oxide (IZO) 204. Similar to graph 400, the layering dielectric materials causes a reduction of reflection of ultraviolet light, and an increase in the reflection of infrared spectrum. The IZO 204 also works to enhance absorption of high-energy visible light by the optical substrate 102 however.

As Table 700 in FIG. 7 shows, the method 800 involves applying alternating layers of dielectric materials in multiple coats comprising a low index dielectric material 106, a high index dielectric material 202, and an Indium Zinc Iodide material. This includes applying 145.00 nm of the low index dielectric material 106 on the first surface 104 of the optical substrate 102; and applying 15.19 nm of the high index dielectric material 202 on the first surface 104 of the optical substrate 102. The subsequent applications of dielectric materials are as described above. Table 700 also provides an example of a stack design utilized to create the layering/coating of dielectric materials. In any case, the addition of ZIO is effective for protecting the eyes from harmful backside UV reflection; absorbing HEV light; increasing visible light transmission for the visible spectrum; and reflecting infrared light away from the eye.

Figure 8:
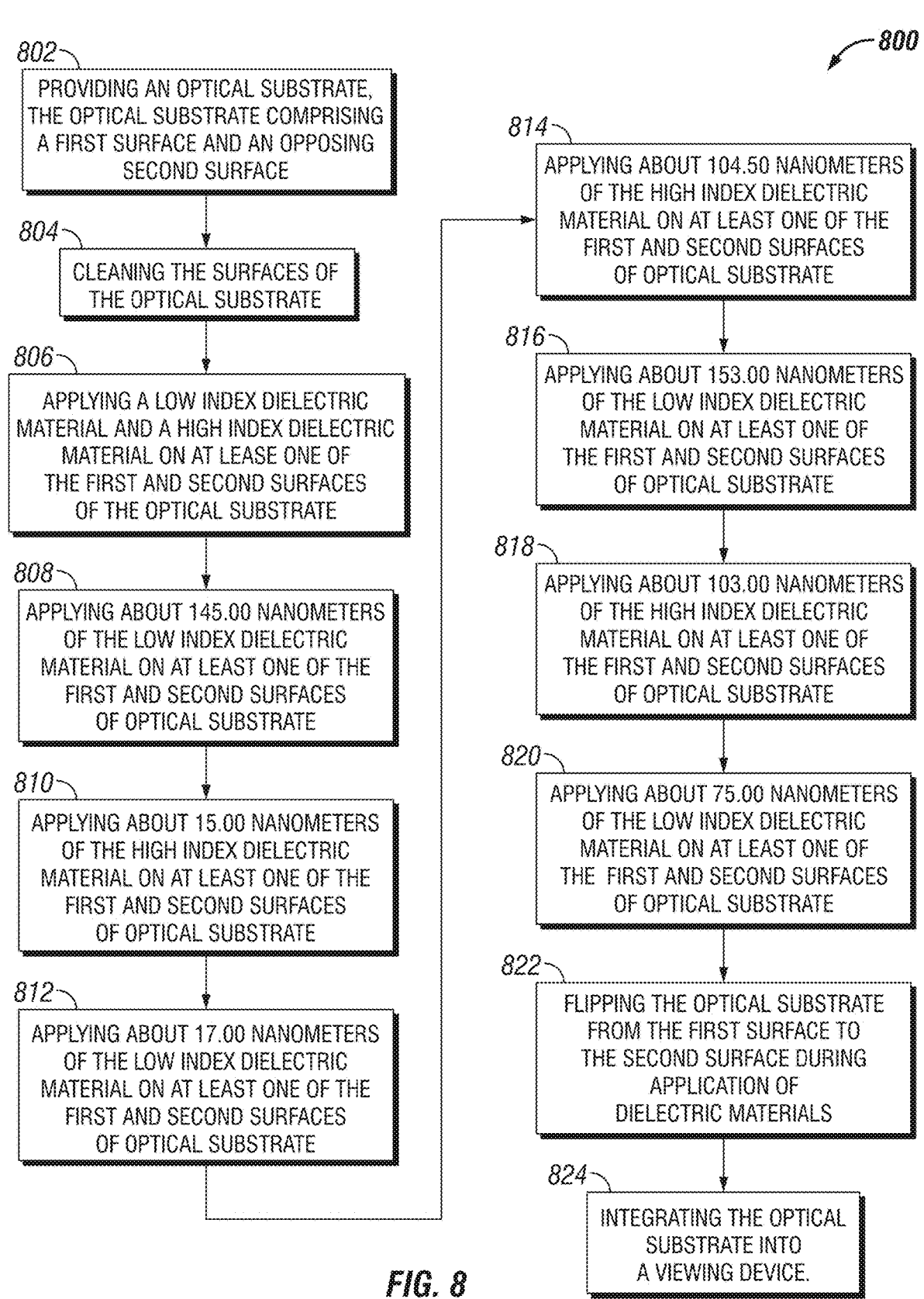
FIG. 8 shows a flowchart of an exemplary method for coating a thin film optical lens, in accordance with an embodiment of the present invention.

FIG. 8 references a flowchart of an exemplary method 800 for coating a thin film optical lens 100. The method 800 is configured to apply alternating layers with varying thicknesses of a low index dielectric material 106 and a high index dielectric material 202 on at least one of the surfaces 104, 200 of the optical substrate 102, described above. The low and high index dielectric materials 106, 202, 204 are layered on the optical substrate 102 through thin film deposition means to create a desired spectral result in the optical substrate 102. The low index dielectric material 106 can include $SiO_2$. The high index dielectric material 202 can include $ZrO_2$, or possibly an Indium Zinc Oxide 204 material.

In some embodiments, the method 800 may include an initial Step 802 of providing an optical substrate 102, the optical substrate 102 comprising a first surface 104 and an opposing second surface 200, the first surface 104 being operable to at least partially reflect infrared radiation, the second surface 200 being operable to at least partially transmit ultraviolet light in the wavelength range between 300 to 400 nanometers. Another Step 804 may include cleaning the surfaces of the optical substrate 102. The cleaning may include simple hand-cleaning of the optical substrate 102 with a lens-friendly cloth.

The method 800 also includes a Step 806 of applying a low index dielectric material 106 and a high index dielectric material 202 on at least one of the first and second surfaces 104, 200 of the optical substrate 102. In one possible embodiment, the low index dielectric material 106 comprises a SiO$_2$ material having a refractive index of 1.46. In another embodiment, the high index material is a ZrO$_2$ material, or possibly an Indium Zinc Oxide 204 (IZO) material. The high index material may have a refractive index of 2.06. The low index dielectric material 106 and the high index dielectric material 202 being applied in a unique order.

For example, a Step 808 of applying about 145.00 nanometers of the low index dielectric material 106 on at least one of the first and second surfaces 104, 200 of the optical substrate 102. A Step 810 comprises applying about 15.00 nanometers of the high index dielectric material 202 on at least one of the first and second surfaces 104, 200 of the optical substrate 102.

Another Step 812 comprises applying about 17.00 nanometers of the low index dielectric material 106 on at least one of the first and second surfaces 104, 200 of the optical substrate 102. Yet another Step 814 comprises applying about 104.50 nanometers of the high index dielectric material 202 on at least one of the first and second surfaces 104, 200 of the optical substrate 102. Another Step 816 comprises applying about 153.00 nanometers of the low index dielectric material 106 on at least one of the first and second surfaces 104, 200 of the optical substrate 102.

Yet another Step 818 comprises applying about 103.00 nanometers of the high index dielectric material 202 on at least one of the first and second surfaces 104, 200 of the optical substrate 102. Yet another unique concept of method 800 includes a Step 820, which involves applying about 75.00 nanometers of the low index dielectric material 106 on at least one of the first and second surfaces 104, 200 of the optical substrate 102.

The application of the low and high index dielectric materials 202 is in an ordered, and specific thickness. Also, the application of dielectric materials is performed through the thin film deposition mechanism 300. As a result of this novel application/coating process, the first surface 104 of the optical substrate 102 reflects up to 40% of the infrared radiation. And further, the second surface 200 of the optical substrate 102 transmits about 99% of the ultraviolet light in the wavelength range between 300 to 400 nanometers.

Thus, the reflection of a substantial amount of infrared radiation, and the allowance of most of the ultraviolet light in the 300-400 nm range, serve to enhance viewing through the optical substrate 102. This achieves the objective of the present invention, which is to reduce infrared radiation, block HEV light transmission, and reduce backside ultraviolet reflections, while also increasing visible light transmission through an optical substrate 102, such as a viewing lens.

It is significant to note that the low and high index dielectric materials 202 is applied to one surface, flipping the optical substrate 102 and coating the opposite surface in the same manner, or both sides coated simultaneously. Thus, another Step 822 may include flipping the optical substrate 102 from the first surface 104 to the second surface 200 during application of the dielectric materials. This is the case when either of the dielectric materials is applied to only one of the surfaces. When both the low and high index dielectric materials 202 are applied, however, the optical substrate 102 still requires to be flipped, because the thin film deposition mechanism 300 generally coats layers one side at a time.

A final Step 824 followed in the method 800 comprises integrating the optical substrate 102 into a viewing device. As discussed above, the reflection of infrared radiation, and the allowance of ultraviolet light in the 300-400 nm range, serve to enhance viewing through the optical substrate 102. Thus, it is advantageous to install the optical substrate 102 into a sight scope, a gun sight, a telescope, a pair of glasses, and a viewing device, for example. The optical lens may, however, be used in any situation that requires viewing through a lens, in general.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

In conclusion, the thin film optical lens 100 and method 800 for coating an optical substrate 102 serves to apply alternating layers, with varying thicknesses, of a high index dielectric material 202 and a low index dielectric material 106 on the first and second surfaces 104, 200 of an optical substrate 102. The low and high index dielectric materials 106, 202, 204 are layered through thin film deposition. The low index dielectric material 106 is SiO$_2$. The high index dielectric material 202 is ZrO$_2$ and/or Indium Zinc Oxide 204. The spectral results from application of high and low index dielectric materials 106 reduce infrared radiation, block HEV light transmission, and reduce backside ultraviolet reflections, while also increasing visible light transmission through the optical substrate 102. As a result of layering the dielectric materials, the first surface 104 of optical substrate 102 reflects up to 40% of the infrared radiation; and the second surface 200 of optical substrate 102 transmits 99% of ultraviolet light in the wavelength range between 300 to 400 nanometers. Both light effects work to enhance viewing through the optical substrate 102.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of coating a thin film optical lens, the method comprising:

providing an optical substrate, the optical substrate comprising a first surface and an opposing second surface, the first surface being operable to at least partially reflect infrared radiation, the second surface being operable to at least partially transmit ultraviolet light in the wavelength range between 300 to 400 nanometers;

hand-cleaning the surfaces of the optical substrate;

applying SiO$_2$ and ZrO$_2$ on at least one of the first and second surfaces of the optical substrate, the SiO$_2$ and the ZrO$_2$ being applied in the following order:

applying about 145.00 nanometers of the SiO$_2$ on at least one of the first and second surfaces of the optical substrate;

applying about 15.00 nanometers of the ZrO$_2$ on at least one of the first and second surfaces of the optical substrate;

applying about 17.00 nanometers of the $SiO_2$ on at least one of the first and second surfaces of the optical substrate;

applying about 104.50 nanometers of the $ZrO_2$ on at least one of the first and second surfaces of the optical substrate;

applying about 153.00 nanometers of the $SiO_2$ on at least one of the first and second surfaces of the optical substrate;

applying about 103.00 nanometers of the $ZrO_2$ on at least one of the first and second surfaces of the optical substrate;

applying about 75.00 nanometers of the $SiO_2$ on at least one of the first and second surfaces of the optical substrate; and flipping the optical substrate from the first surface to the second surface during application of the dielectric materials, whereby the applied dielectric materials enable the first surface to reflect up to 40 percent of the infrared radiation, whereby the dielectric materials enable the second surface to transmit about 99 percent of the ultraviolet light in the wavelength range between 300 to 400 nanometers.

2. The method of claim 1, further comprising integrating the optical substrate into a viewing device.

3. The method of claim 1, wherein the $SiO_2$ comprises a refractive index of 1.46.

4. The method of claim 1, wherein the $ZrO_2$ comprises a refractive index of 2.06.

5. The method of claim 1, further comprising a step of applying Indium Zinc Oxide on at least one of the first and second surfaces of the optical substrate.

6. The method of claim 1, wherein the dielectric materials are applied with a thin film deposition mechanism.

7. The method of claim 6, wherein the thin film deposition mechanism comprises an electron beam evaporation and a magnetron reactive sputtering.

\* \* \* \* \*